United States Patent [19]

Viens

[11] Patent Number: 5,427,383
[45] Date of Patent: Jun. 27, 1995

[54] METHOD AND APPARATUS FOR LAYING OUT PLAYING FIELDS

[76] Inventor: Gerard A. Viens, 33 Oxen Dr., Oakland, Me. 04963

[21] Appl. No.: 305,704

[22] Filed: Sep. 14, 1994

[51] Int. Cl.$^6$ .................... A63B 67/00; G01B 3/10
[52] U.S. Cl. .................. 273/411; 273/29 R; 273/56; 33/759
[58] Field of Search ............ 33/756, 758, 759, 760; 273/411, 29 R, 31, 56; 135/905

[56] References Cited

U.S. PATENT DOCUMENTS

| | | |
|---|---|---|
| 1,240,498 | 9/1917 | Sherwood . |
| 3,039,197 | 6/1962 | Abbott . |
| 3,066,416 | 12/1962 | Gutting . |
| 3,536,327 | 10/1970 | Kaehne . |
| 3,948,521 | 4/1976 | Warren . |
| 4,880,243 | 11/1989 | Raub . |
| 5,107,595 | 4/1992 | Stay et al. . |
| 5,142,787 | 9/1992 | Dadisman . |
| 5,280,921 | 1/1994 | Milburn . |

Primary Examiner—Raleigh W. Chiu
Attorney, Agent, or Firm—Sandler, Greenblum & Bernstein

[57] ABSTRACT

A playing field layout device includes an alignment guide having a plurality of lines marked thereon. A stake is inserted in the alignment guide, and a cord has one end attached to the stake. The cord has a plurality of marks thereon. The playing field may be, for example, volleyball, croquet, or badminton and may be laid out by aligning the cord over relevant lines and marking distances at predetermined locations indicated by the marks. The layout device may then be removed from the playing field so that it does not interfere with the participants.

17 Claims, 7 Drawing Sheets

METHOD AND APPARATUS FOR LAYING OUT PLAYING FIELDS

BACKGROUND OF THE INVENTION

1. Field of the Invention

The present invention is directed to a method for laying out playing fields for activities such as volleyball, croquet or badminton. The boundaries of the playing field may be marked by using a simple apparatus and such boundaries do not interfere with the participants of the activities. The invention is also directed to measuring the relative distance between balls in a game such as bocce.

2. Description of Background and Relevant Information

Various apparatus and methods have been used for laying out different playing fields. However, such known apparatus are complicated and at least part of the apparatus remains on the field and may interfere with the participants of the activity.

KAEHNE, U.S. Pat. No. 3,536,327, discloses a center marker having four flexible connector elements which are aligned with lines on the marker, with the connector elements and marker remaining on the playing field.

SHERWOOD, U.S. Pat. No. 1,240,498, discloses an apparatus for laying out boundary lines of a tennis court by pivoting two flexible elements so that they intersect at various points along such elements.

ABBOTT, U.S. Pat. No. 3,039,197, discloses a device for laying out the positions of wickets and stakes for a croquet court. A longitudinal tape and side tapes are secured by stakes to the ground and wickets are positioned corresponding to various marks on the tapes.

MILBURN, U.S. Pat. No. 5,280,921, discloses a cable having marks to indicate the positions of chalk lines on football or soccer fields.

WARREN, U.S. Pat. No. 3,948,521, and RAUB, U.S. Pat. No. 4,880,243, disclose flexible boundaries for playing fields which are positioned on the ground and remain during the activity to mark such boundaries.

Other devices using flexible connectors and corner elements are used for laying out corners of buildings or the like and include GUTTING, U.S. Pat. No. 3,066,416, STAY et al., U.S. Pat. No. 5,107,595, and DADISMAN, U.S. Pat. No. 5,142,787.

None of these patents, however, disclose a simple device to ensure easy and consistent layout of a particular playing field, using a simple guide and premeasured marked cord.

SUMMARY OF THE INVENTION

The method and apparatus of the present invention uses a simple marked alignment device, a stake, and a premeasured and marked cord. The alignment device can be of any shape, such as round, square, or multisided. Such an alignment device can be made of fabric, cardboard, or a hard material such as plastic or metal. The alignment device includes alignment lines which are clearly marked and visible. The stake fixes the alignment device in place and allows the cord to be connected thereto to move into alignment with the various alignment lines. The stake may be, for example, a nail or an eye bolt. The cord may be of any thickness and construction, and attachment to the stake should be secured to avoid changing of the distance or location of the marks on the cord. The marks on the cord may be painted, or can also be clips, tapes, knots, or any other element that clearly indicates the desired location on the cord.

An object of the present invention is to simply and efficiently allow the layout and marking of a playing field by using a minimum number of elements which do not interfere with the participants during the activities on such playing fields.

According to another aspect of the present invention, a device similar to that for marking a playing field may be used to measure the relative distances between playing balls in a bocce game.

An object of the present invention is a simplified method for laying out a playing field and includes placing an alignment guide at a predetermined position on the playing field. The alignment guide includes a plurality of lines at predetermined angles with respect to each other and a flexible element having a plurality of marks at predetermined positions therealong. One end of the flexible element is placed at an intersection of the plurality of lines. The flexible element is aligned over one of the lines and marks a position on the field at a location corresponding to a first of the plurality of marks on the flexible element. The flexible element is then moved to a position over another of the lines and a position on the field corresponding to a position of another of the plurality of marks is marked. The alignment guide and flexible element are then removed from the field after all of the desired locations on the field are marked.

According to another aspect of the invention a stake is inserted into the intersection of the lines on the alignment guide and one end of the flexible element is connected to the stake. The intersection of the lines is at the center of the alignment guide. The alignment guide is supported on a supporting surface and the stake is inserted through the alignment guide into the supporting surface.

According to another aspect of the invention, one of the plurality of lines and one of the plurality of marks determines the location of a net post, and at least one of the plurality of lines and at least one the plurality of marks determines a corner of the playing field. The playing field may be, for example, a volleyball court, croquet court, or badminton court.

Another object of the invention is to provide a simple device for laying out a playing field, comprising an alignment guide having a plurality of lines at predetermined angles relative to each other; a stake being inserted into the alignment guide at an intersection of the lines; and a flexible element having one end attached to the stake and a plurality of marks at predetermined distances from the one end.

The intersection of the lines may be at a the center of the alignment guide, and each of the plurality of marks may be painted on the flexible element. Also, the stake may be an eye bolt.

Another object of the invention is to provide a device for measuring the relative distance between a first ball and second ball. The device includes a guide which fits over the first ball, and a flexible element is connected to the guide, whereby the distance from the first ball to the second ball may be indicated on the flexible element. The guide may include a plurality of legs which fit over the first ball and contact a supporting surface.

BRIEF DESCRIPTION OF THE DRAWINGS

The invention is further explained in the description which follows with reference to the drawings, illustrating, by way of non-limiting examples, various embodiments and aspects of the invention wherein.

DETAILED DESCRIPTION OF THE PREFERRED EMBODIMENTS

Figure 1:
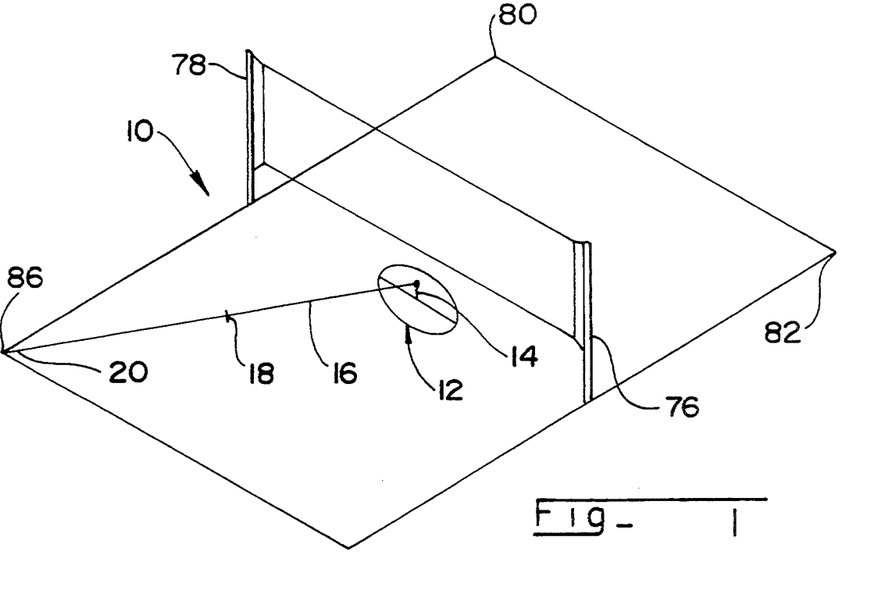
FIG. 1 is a perspective view of the invention used for laying out a volleyball court.
Figure 2:
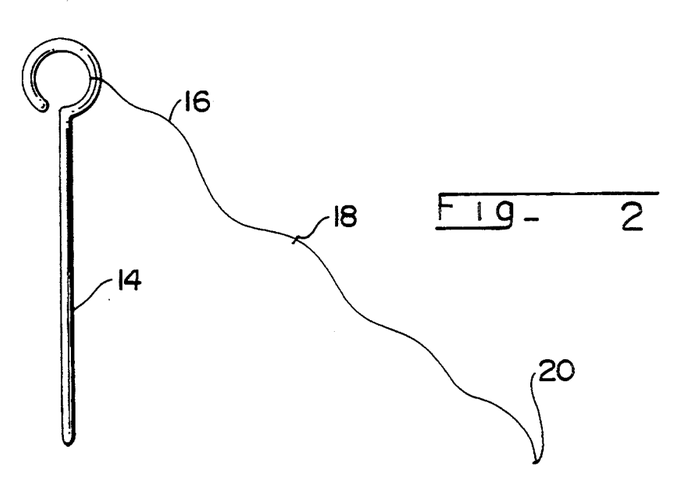
FIG. 2 is a view of the stake and marked cord.

The court layout device of the present invention includes an alignment guide 12, as illustrated in more detail in FIGS. 3, 5, 7 and 9, a stake 14, and a marked cord 16. As illustrated in FIG. 1, alignment guide 12 is shown as a thin, circular disc. However, the alignment guide may comprise any shape to accomplish the function described below, an preferably has planar upper and lower surfaces. As illustrated in FIG. 2, the stake may be an eye bolt. Also, a nail or any other elongated element may be used, especially elongated elements having a sharp end. Cord 16 includes marks at predetermined distances 18 and 20. The marks on the cord may be painted, clips, tapes, knots, or anything that clearly indicates the predetermined and measured location(s) on the cord.

Figures 3, 4:
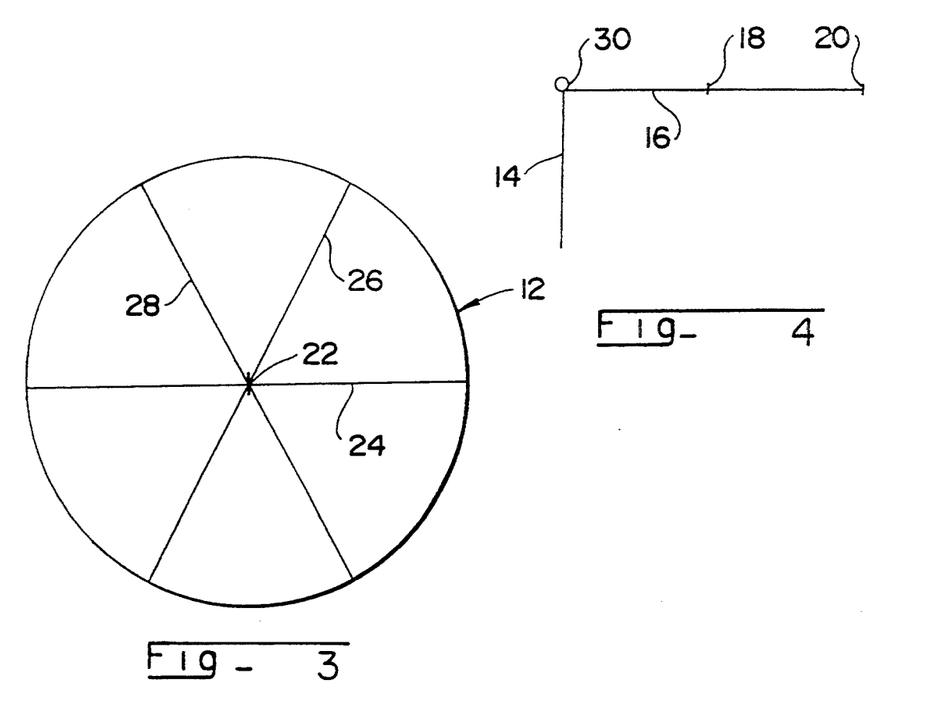
FIG. 3 is a plan view of the alignment guide used for laying out a volleyball court.
FIG. 4 is a side view of the stake and marked cord for use in laying out the volleyball court in cooperation with the alignment guide of FIG. 3.

FIGS. 3 and 4 illustrate the alignment guide 12, stake 14, and marked cord 16 for use in laying out a volleyball court. The alignment guide 12 includes a center 22, a net diameter line 24, and first and second corner lines 26 and 28, respectively. As illustrated in FIG. 4, the marked cord includes first and second marks 18 and 20, respectively.

For laying out a standard volleyball court, the following dimensions may be used. An angle between net line 24 and respective first and second corner lines 26 and 28 may be 63.4°. The distance between the end of the cord 30 which is connected to stake 14 and the first mark 18 may be between 15 ft. and 15 ft. 9 in., depending on the type of net used. The distance between end 30 and the second mark 20 may be 32 ft. 11 13/16 in. These dimensions provide for the layout of a standard volleyball court as will be described in more detail below. However, any other dimensions may be used to provide the size of the court desired.

Figure 5:
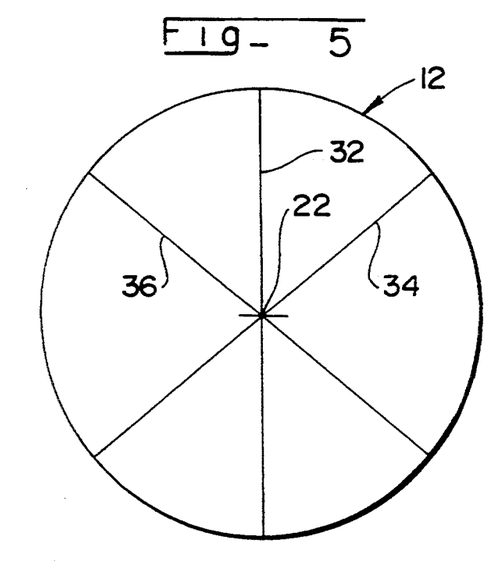
FIG. 5 is a plan view of the alignment guide for use in laying out a croquet court.
Figure 6:
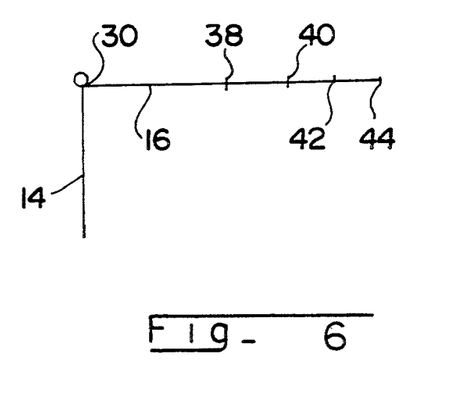
FIG. 6 is a side view of the stake and marked cord used for laying out the croquet court in cooperation with the alignment guide of FIG. 5.

FIGS. 5 and 6 illustrate an alignment guide 12, stake 14, and marked cord 16 used for laying out a croquet court. This example is directed to a 9 wicket croquet court; however, the angles and dimensions may be changed, if necessary, to lay out any croquet court. The differences between the alignment guide, stake and marked cord of FIGS. 5 and 6 differ from that illustrated in FIGS. 3 and 4 by the angles of the lines on the alignment guide and the length and positions of the marks on the cord. Accordingly, the same reference numerals will be used for like elements in FIGS. 5 and 6.

Alignment guide 12 includes a center 22, end stake line 32, and first and second side wicket lines 34 and 36, respectively. As illustrated in FIG. 6, marked cord 16 includes first mark 38, second mark 40, third mark 42, and end mark 44. The following dimensions may be used for laying out a half-size 9 wicket croquet court. An angle between end stake line 32 and respective first and second side wicket lines 36 and 34 may be 49.9°. The distance from end 30 to first mark 38 may be 12 ft. 5 in.; the distance from end 30 to second mark 40 may be 16 ft.; the distance from end 30 to third mark 42 may be 19 ft.; and the distance from end 30 to end mark 44 may be 22 ft. Of course, any dimensions may be used to obtain the size and type of the croquet court desired.

Figure 7:
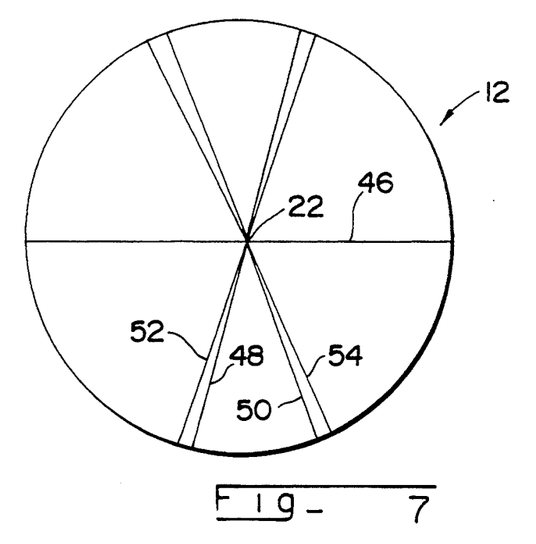
FIG. 7 is a plan view of the alignment guide used for laying out a badminton court.
Figure 8:
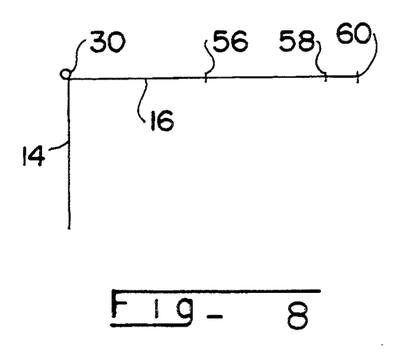
FIG. 8 is a side view of the stake and marked cord for laying out the badminton court in cooperation with the alignment of that of FIG. 7.

FIGS. 7 and 8 illustrate an alignment guide 12, stake cord 14, and marked cord 16 for use in laying out a badminton court. Alignment guide 12 includes center 22, net line 46, first and second singles corner lines 48 and 50, respectively, and first and second doubles corner lines 52 and 54, respectively. Either the single or the doubles corner lines are used, depending upon whether singles badminton or doubles badminton is played. As illustrated in FIG. 8, the marked cord includes net post mark 56, singles corner mark 58, and doubles corner mark 60.

The following dimensions may be used to obtain the layout of a standard badminton court. The angle between net line 46 and respective doubles corner lines 52 and 54 may be 65.6°. The angle between net line 46 and each of singles corner lines 48 and 50 may be 68.9°. As illustrated in FIG. 8, the distance between end 30 and net post mark 56 may be 10 ft., depending upon the type of net used; the distance from end 30 to singles corner mark 58 may be 23 ft. 7 in.; and the distance from end 30 to doubles corner mark 60 may be 24 ft. 2 in. Of course, any dimensions may be used to obtain the size of the court desired.

Figures 9, 10:
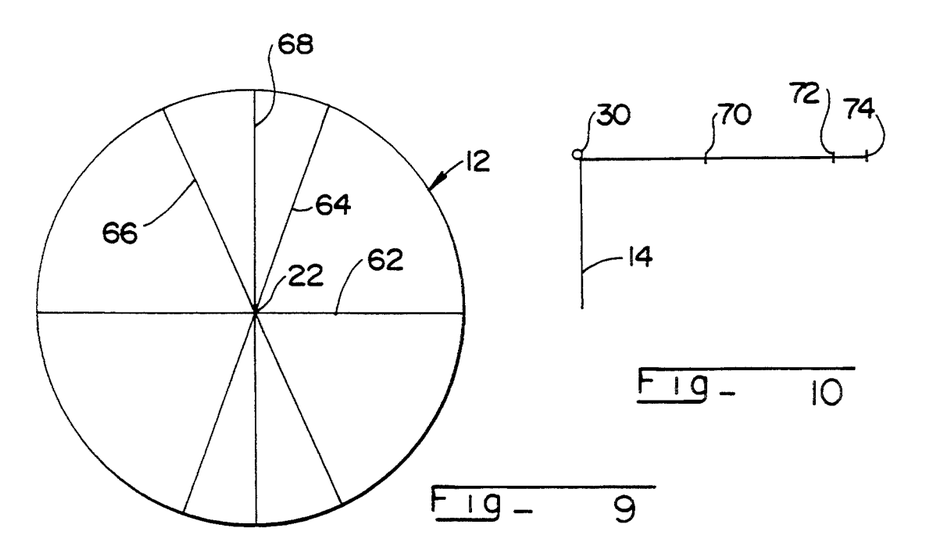
FIG. 9 is a plan view of alignment guide used for laying out a court for the game "BAK-AT-CHA" which is produced by Forster Inc. of Wilton, Me.
FIG. 10 is a side view of the stake and marked cord used in cooperation with the alignment guide of FIG. 9.

FIGS. 9 and 10 illustrate an alignment guide 12, stake 14, and marked cord 16 for use in the game known as "BAK-AT-CHA". Again, like reference numerals will be used for like elements as discussed above.

Alignment guide 12 includes a center 22, net line 62, first and second corner lines 64 and 66, respectively, and point line 68. As illustrated in FIG. 10, marked cord 16 includes net post mark 70, diamond vertex mark 72 (which is used when the cord is aligned with point line 68), and corner mark 74.

The following dimensions may be used to obtain a standard "BAK-AT-CHA" court. The angle from point line 68 to each of the corner lines 64 and 66 may be 22.6°. The distance from end 30 to net post mark 70 may be 10 ft. 6 in.; the distance from end 30 to diamond vertex mark 72 may be 25 ft.; and the distance from end 30 to corner mark 74 may be 26 ft. Of course, any dimensions may used to obtain the size of the court desired.

Figure 11:
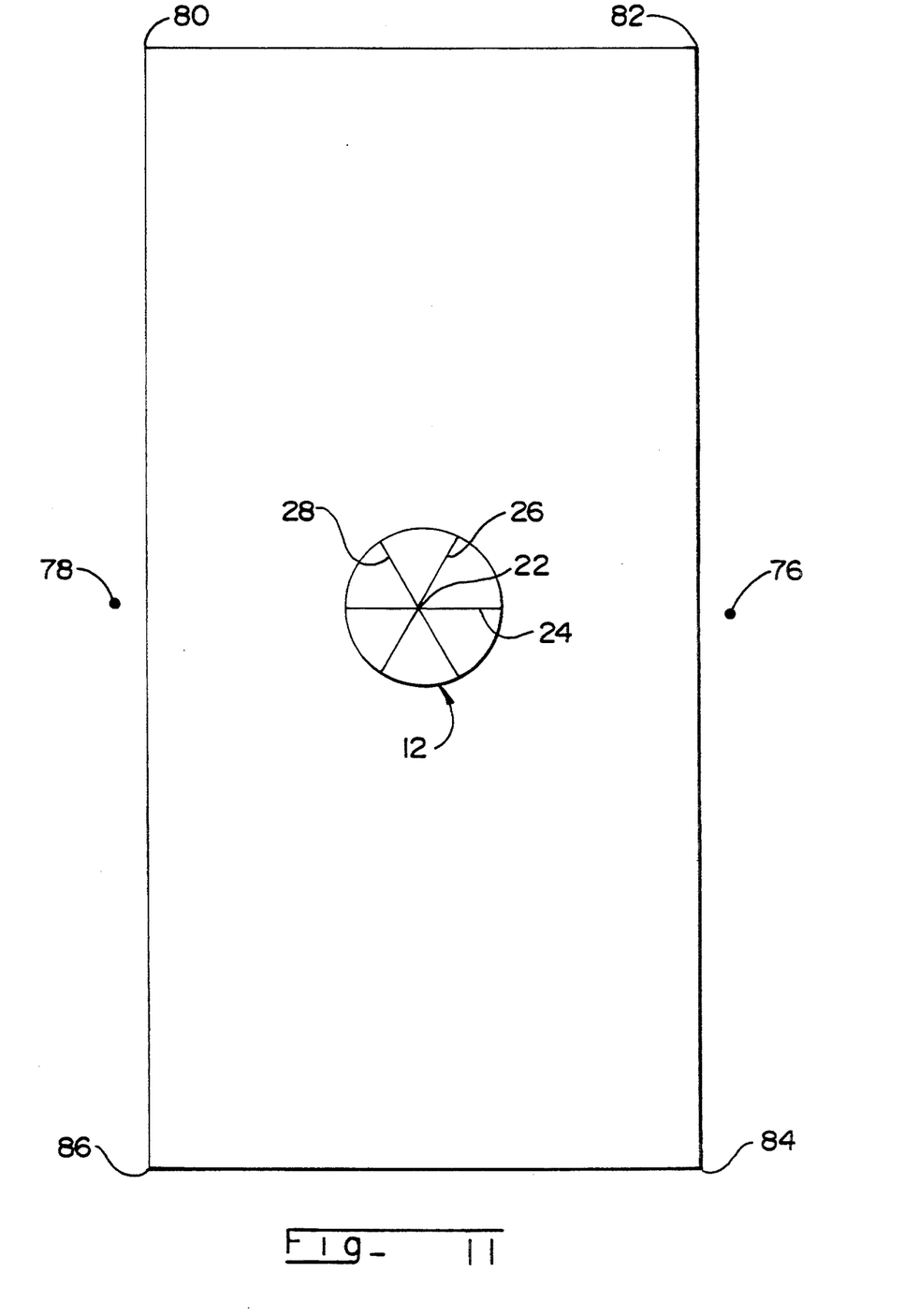
FIG. 11 is a plan view explaining the method of the present invention for laying out a volleyball court.
Figure 12:
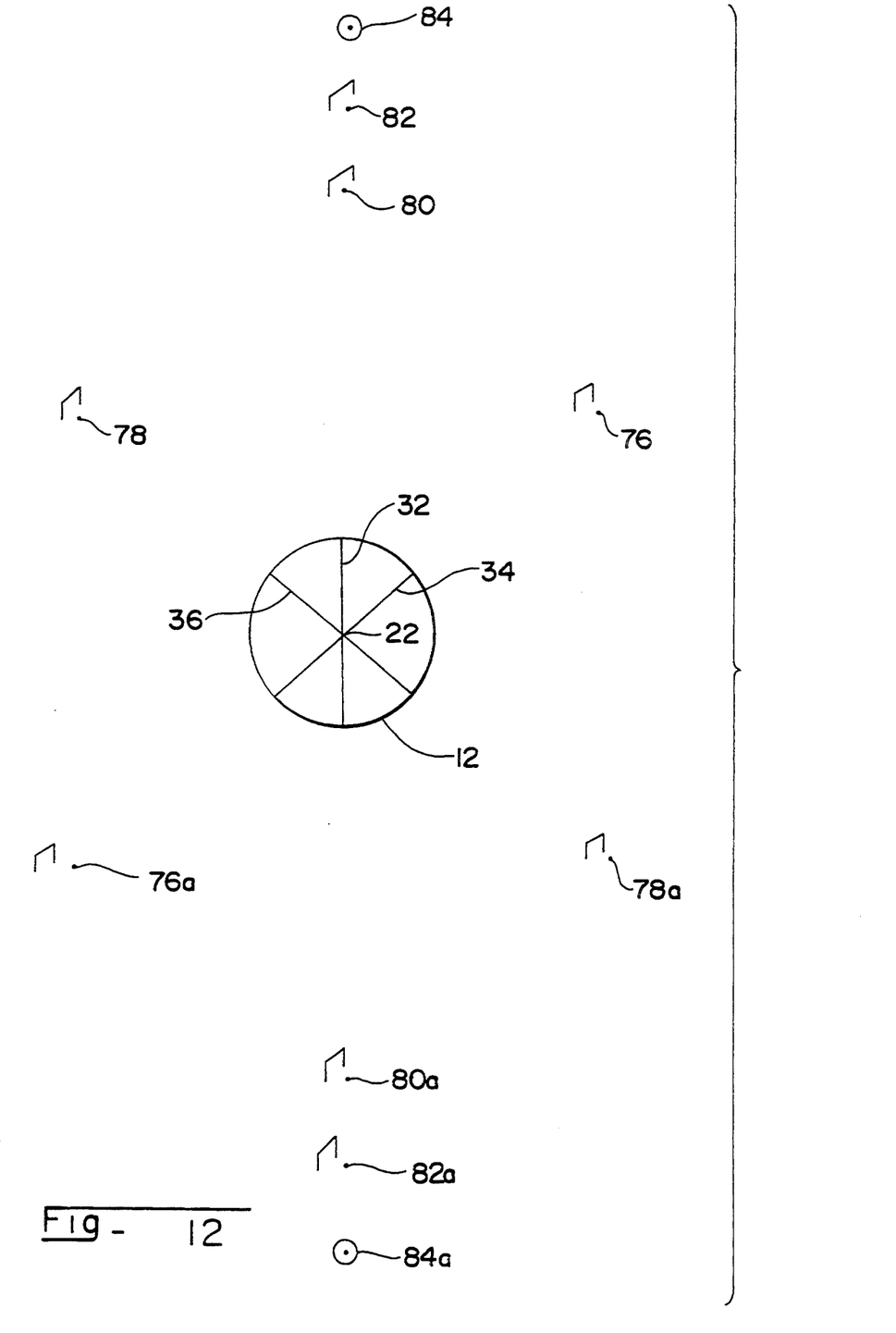
FIG. 12 is a plan view explaining the method of the present invention for laying out a croquet court.

Examples for the methods of the present invention will now be described with reference to FIGS. 11 and 12. FIG. 11 illustrates the steps for laying out a volleyball court. Initially, alignment guide 12 is placed at the center of the court. Line 24 is oriented to extend in the proposed direction of the net. Stake 14 is inserted into center 22 of the alignment guide to secure such guide to the ground. Marked cord 16 is then extended along net line 24 to, for example, the right in FIG. 11, whereupon mark 18 would indicate the location of net post 76 (see FIG. 1). Marked cord 16 is then extended to the left in FIG. 11 whereupon mark 18 indicates the location of net post 78. Cord 16 is then extended along line 28 to the top of FIG. 11 whereupon mark 20 would indicate the position of corner 80. The cord is extended along line 28 to the bottom of FIG. 11, mark 20 would indicate the location of corner 84. Cord 16 is then extended along line 26, whereupon mark 20 locates corner 82, and towards the bottom of FIG. 11 along line 26, whereupon mark 20 locates corner 86. Of course, such location of net posts and corners may be obtained in any order desired.

When the locations of the net posts and corners are obtained, alignment guide 12, stake 14 and marked cord 16 may then be removed, and accordingly do not interfere with the participants during the volleyball game.

The layout of a 9 wicket croquet court will now be described with reference to FIG. 12. Alignment guide 12 is placed in the middle of the court where the center wicket (not shown) will be located. Alignment guide 12 is placed with end stake line 32 oriented perpendicular to the center wicket. Stake 14 is inserted into center 22 and into the ground to hold the alignment guide in place. Marked cord 16 is aligned with first side wicket line 34, whereupon first mark 38 locates wicket 76. The cord is then moved to be aligned with line 36 and first mark 38 locates wicket 78. The cord is then aligned with end stake line 32, whereupon second mark 40 locates wicket 80. While cord 16 is still aligned with line 32, third mark 42 locates wicket 82, and while cord 16 is still aligned with end stake line 32, end mark 44 locates goal stake 84.

The same procedure is used on the opposite side of the court to locate wickets 76a, 78a, 80a, 82a, and goal stake 84a.

Similar procedures may be used to lay out a badminton court using the arrangement illustrated in FIGS. 7 and 8, and a "BAK-AT-CHA" court using the arrangement illustrated in FIGS. 9 and 10 in a similar manner as described above.

Figure 13:
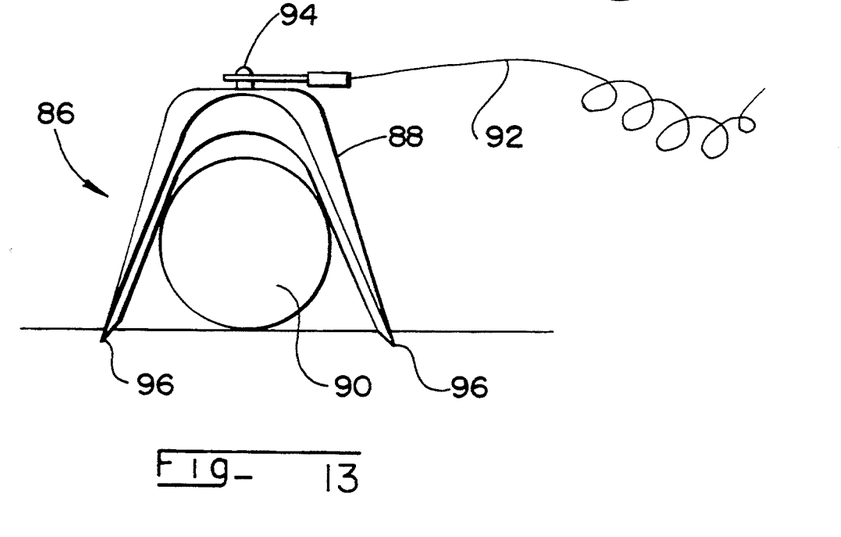
FIG. 13 is side view of a device used for measuring relative distances between bocce balls.
Figure 14:
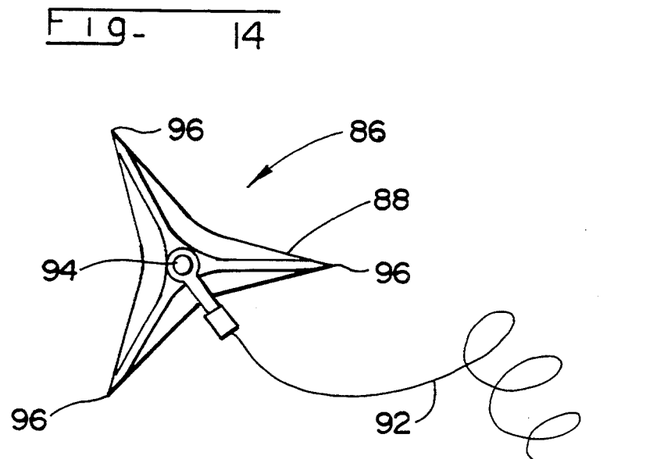
FIG. 14 is a plan view of the device of FIG. 13.
Figure 15:
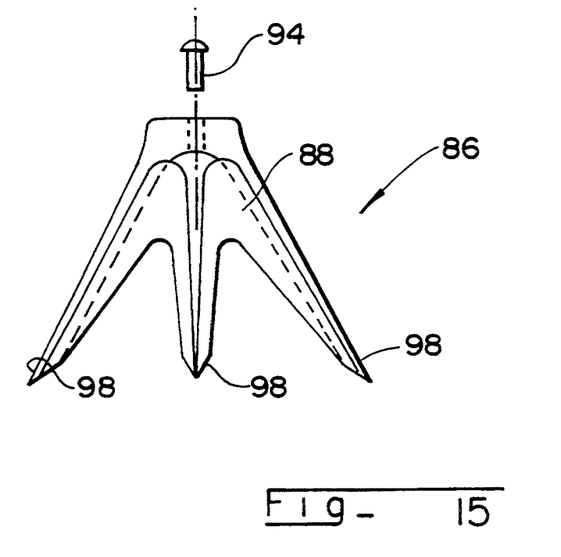
FIG. 15 is a side view of a second embodiment of the device for measuring relative distances between bocce balls.
Figure 16:
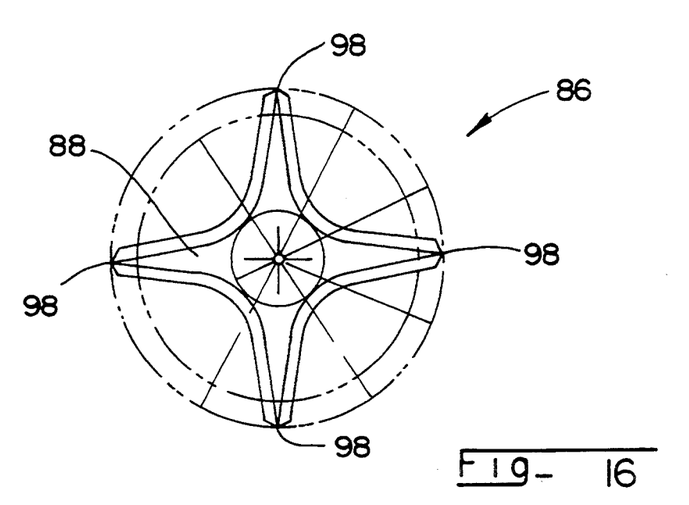
FIG. 16 is a plan view of the device of FIG. 15.

Another aspect of the present invention is to use a similar device 86 comprising a guide and cord to measure relative distances between bocce balls during a game of bocce, such measurement being necessary during the playing of such game. As illustrated in FIGS. 13 and 14, alignment guide 88 fits over a bocce ball 90. Cord 92 is attached to alignment guide 88 by pin 94. Alignment guide 88 may have three legs 96 as illustrated in FIGS. 13 and 14 or four legs 98 as illustrated in FIGS. 15 and 16. The legs only need be arranged so that alignment guide 88 may fit over a bocce ball 90 and contact the ground.

During the game, alignment guide 88 is placed over one bocce ball 90 and cord 92 is extended to other desired bocce balls to readily determine the relative distances of such other bocce balls from bocce ball 90 by marking or indicating the positions of the other balls on cord 92.

Although the invention has been described with reference to particular means, materials, and embodiments, it is to be understood that the invention is not limited to the particulars disclosed and extends to all equivalents within the scope of the claims.

What is claimed is:

1. A method for laying out a playing field comprising:
   placing an alignment guide at a predetermined position on the playing field, the alignment guide including a plurality of lines at predetermined angles with respect to each other;
   placing one end of a flexible element at an intersection of said plurality of lines, the flexible element having a plurality of marks at predetermined positions therealong;
   aligning the flexible element over one of the lines and marking a position on the field at a location corresponding to a first of said plurality of marks on the flexible element; and
   moving said flexible element to a position over another of said lines and marking a position on the field corresponding to a position of another of the plurality of marks.

2. The method according to claim 1, comprising removing the alignment guide and flexible element from the field after the positions on the field are marked.

3. The method according to claim 1, comprising inserting a stake into the intersection of the lines on the alignment guide and connecting the one end of the flexible element to the stake.

4. The method according to claim 3, wherein the alignment guide is supported on a supporting surface and the stake is inserted through the alignment guide into the supporting surface.

5. The method according to claim 1, wherein the intersection of the lines is at the center of the alignment guide.

6. The method according to claim 1, wherein one of the plurality of lines and one of the plurality of marks determines the location of a net post.

7. The method according to claim 1, wherein at least one of the plurality of lines and at least one the plurality of marks determines a corner of the playing field.

8. The method according to claim 1, wherein the playing field is a volleyball court.

9. The method according to claim 1, wherein the playing field is a croquet court.

10. The method according to claim 1, wherein the playing field is a badminton court.

11. A device for laying out a playing field comprising:
   an alignment guide having a plurality of lines at predetermined angles relative to each other;
   a stake capable of being inserted into the alignment guide at an intersection of said lines; and
   a flexible element having one end attached to said stake and a plurality of marks at predetermined distances from said one end.

12. The device for laying out a playing field according to claim 11, wherein said intersection of said lines are at a the center of said alignment guide.

13. The device for laying out a playing field according to claim 11, wherein each of the plurality of marks is painted on said flexible element.

14. The device for laying out a playing field according to claim 11, wherein each of the plurality of marks is a knot on said flexible element.

15. The device for laying out a playing field according to claim 11, wherein each of the plurality of marks is a clip on said flexible element.

16. The device for laying out a playing field according to claim 11, wherein each of the plurality of marks is a tape on said flexible element.

17. The device for laying out a playing field according to claim 11, wherein said stake is an eye bolt.

* * * * *